(12) United States Patent
Diasparra

(10) Patent No.: US 9,961,289 B2
(45) Date of Patent: May 1, 2018

(54) IMAGE SENSOR WITH CONTROL SIGNAL SEQUENCE GENERATION

(71) Applicant: E2V SEMICONDUCTORS, Saint Egreve (FR)

(72) Inventor: Bruno Diasparra, Seyssins (FR)

(73) Assignee: E2V SEMICONDUCTORS, Saint Egreve (FR)

( * ) Notice: Subject to any disclaimer, the term of this patent is extended or adjusted under 35 U.S.C. 154(b) by 11 days.

(21) Appl. No.: 15/028,755

(22) PCT Filed: Oct. 10, 2014

(86) PCT No.: PCT/EP2014/071785
§ 371 (c)(1),
(2) Date: Apr. 12, 2016

(87) PCT Pub. No.: WO2015/055538
PCT Pub. Date: Apr. 23, 2015

(65) Prior Publication Data
US 2016/0277697 A1    Sep. 22, 2016

(30) Foreign Application Priority Data
Oct. 16, 2013   (FR) .................................... 13 60062

(51) Int. Cl.
*H04N 5/335* (2011.01)
*H04N 3/14* (2006.01)
(Continued)

(52) U.S. Cl.
CPC ........... *H04N 5/3765* (2013.01); *H04N 5/353* (2013.01); *H04N 5/376* (2013.01); *H04N 5/378* (2013.01)

(58) Field of Classification Search
None
See application file for complete search history.

(56) References Cited

U.S. PATENT DOCUMENTS

| 2004/0019817 A1 | 1/2004 | Dahlgren et al. |
| 2007/0146523 A1 | 6/2007 | Tozawa et al. |
| 2012/0206633 A1 | 8/2012 | Huo et al. |

FOREIGN PATENT DOCUMENTS

EP    1079614 A1    2/2001

OTHER PUBLICATIONS

International Search Report and Written Opinion for PCT/EP2014/071785, dated Jan. 20, 2015.

*Primary Examiner* — Stephen Coleman
(74) *Attorney, Agent, or Firm* — Hauptman Ham, LLP

(57) ABSTRACT

The invention relates to image sensors and more specifically the generation of control signals for pixels and readout circuits.

The sequencing circuit which produces these signals comprises: a programmable memory (MEM) containing binary words (M0, M1, M2, etc.) in which each word comprises a group of several bits of position 1 to N, and in which the position i of a bit in a word corresponds to the position i of a respective control signal; a memory controller (CTRL_MEM) for extracting from the memory at a determined rate the words located at successive addresses of the memory from a start address to an end address; and a control signal generation circuit (GEN_TIMING) establishing each control signal of position i from the succession of bits of respective position i that are extracted from the memory by the controller, the control signal reproducing the successive values taken by the bit of position i at the clock rate.

7 Claims, 3 Drawing Sheets

(51) Int. Cl.
*H04N 5/376* (2011.01)
*H04N 5/353* (2011.01)
*H04N 5/378* (2011.01)

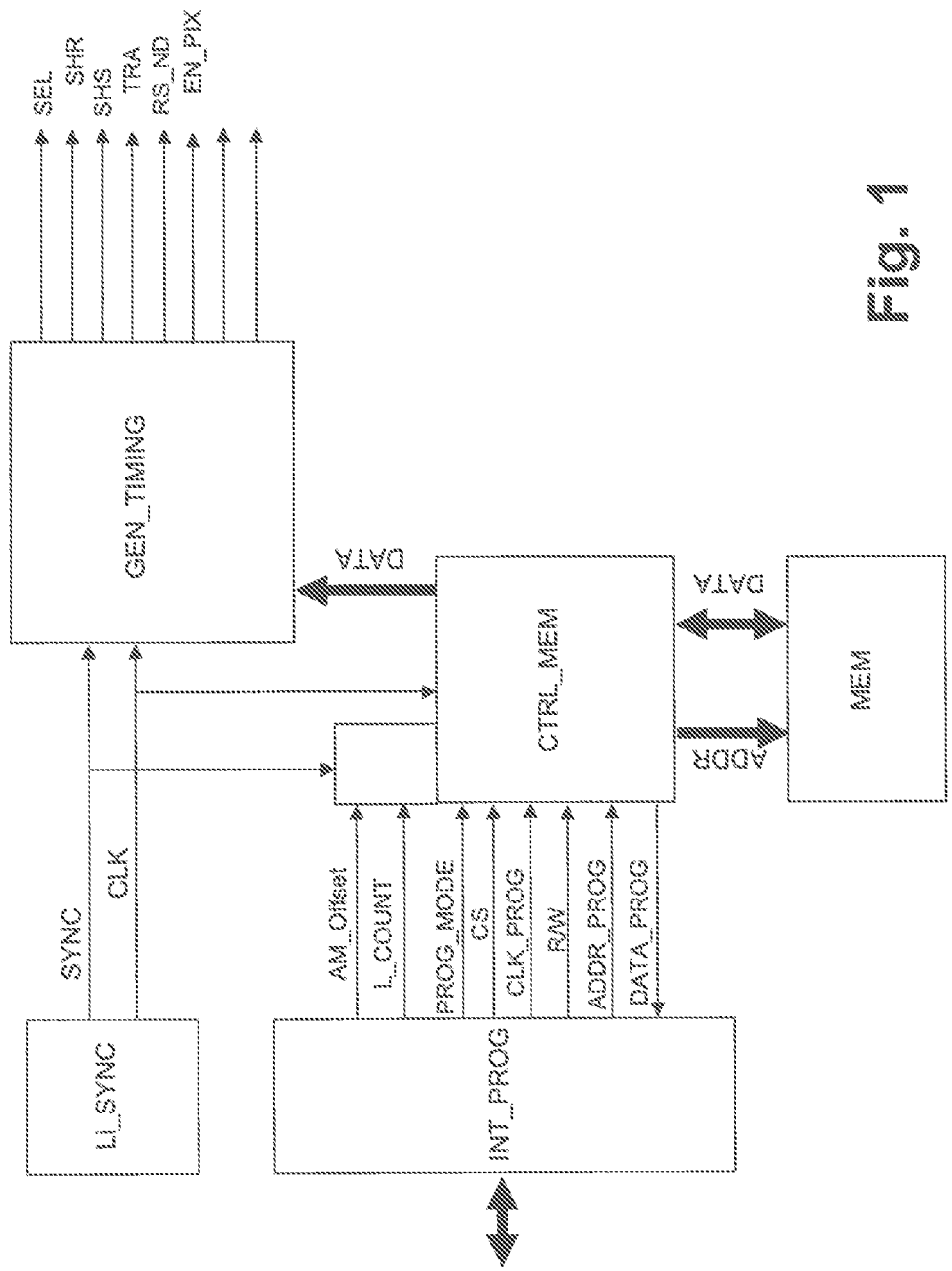

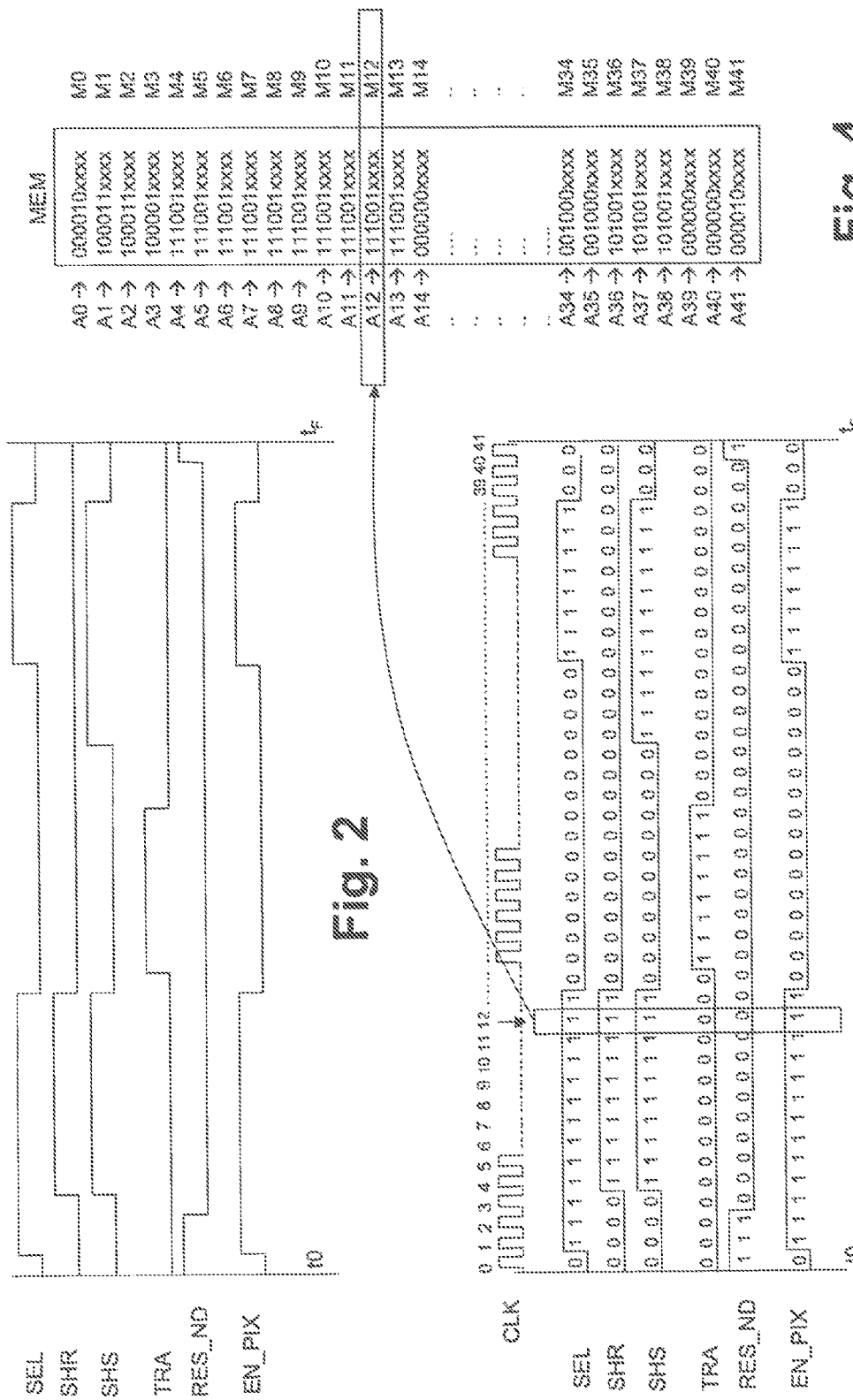

IMAGE SENSOR WITH CONTROL SIGNAL SEQUENCE GENERATION

FIELD

The invention relates to image sensors and more specifically active pixel matrix sensors.

BACKGROUND

An image sensor comprises in general a matrix of rows and columns of pixels in which each pixel includes a light-sensitive element (generally a photodiode) and several control transistors or gates which have different functions such as for example the selection of the pixel with a view to reading out the signal produced by this pixel, the reset of a charge storage node at each integration period, the reset of the photodiode if necessary, and the transfer of charges from the photodiode to the storage node at the end of an integration duration.

The pixels therefore receive various control signals according to a very precise time sequence for each signal in relation to the other signals. The time sequence repeats periodically according to a frame cycle which provides for reading the information indicating the level of light generated in each of the pixels of the matrix over this cycle.

The signals from the pixels are in general read row by row, the pixels in a row all being selected at the same time by a row selection conductor. Selecting a pixel belonging to this row and to a determined column transfers onto a column conductor common to all the pixels of the same column an electrical signal level generated by the light in this pixel. Readout circuits, at the column base, provide for reading out in parallel the levels received by the column conductors. The rows of pixels are addressed successively in order to be read one after the other by these readout circuits. The control signals for these readout circuits are synchronized with the pixel control signals, for example to sample a voltage level on the column conductor after a reset phase of a charge storage node or after a charge transfer phase from the photodiode to the storage node. The generation of these readout circuit control signals therefore follows rules similar to the generation of the internal control signals for pixels.

Of interest here is the generation of control signals for pixels and/or for readout circuits.

An image sensor can operate in at least two different modes which are respectively:

a "Global Shutter" mode, in which the instant of the start of the integration of charges generated by the light is the same for all the pixels and the instant of the end of the integration of charges after an integration duration Ti (adjustable if necessary) is also the same for all the pixels.

an "Electronic Rolling Shutter", or ERS, mode, in which the integration start instant is defined for each row and is shifted from one row to the next, the integration duration Ti is the same for all the rows, and the integration end instant is therefore shifted from one row to the next.

It is sometimes desired that the same sensor can operate in both the modes above, or even in other modes, and in each mode with variations in the sequencing of the signals. Various control signal sequencing options for pixels and readout circuits must be able to be generated as easily as possible.

In present-day sensors, the pixel control signals and the column base readout circuit control signals are established by means of sequencing circuits specific to each signal. Registers define for each signal or signal portion a start instant and a duration or an end instant, which are expressed with reference to a count of the number of clock pulses of a reference clock. The start instant for the signals linked to the readout of a row can be defined in relation to a zero instant defined by a row sequencer which defines a periodic row cycle. These registers control a state machine which produces the various signals applied to the pixel matrix and to the column base readout circuits.

For certain control signals, two registers for each signal can suffice, containing respectively a start instant and an end instant or a duration of an active level of the signal. For other signals, for example those which include several pulses at the active level over the same cycle, a greater number of registers, for example four or five registers, may be required.

All in all, to create the various signals required for the readout of the pixels, several tens of registers must be provided in the sensor and the registers must be programmed individually.

SUMMARY

To facilitate the programming of the signals required for the operation of the sensor and notably for the operation of the pixels and the readout circuits, and to facilitate the design of sensors suitable for operating in various modes, the invention proposes an image sensor comprising a matrix of rows and columns of active pixels, readout circuits, and a sequencing circuit for applying control signals to the pixels and/or to the readout circuits according to clearly determined sequences, characterized in that the sequencing circuit comprises:

a programmable addressable memory containing binary words in which each word comprises a group of several bits of position 1 to N, and in which the position i of a bit in a word corresponds to the position i of a respective control signal from among a series of control signals for pixels and/or readout circuits of the sensor, a memory controller for extracting from the memory at a fixed rate the words located at successive addresses of the memory from a start address to an end address, and a control signal generation circuit establishing each control signal of position i from the succession of bits of respective position i that are extracted from the memory by the controller, the control signal having a first value or a second value according to the value of the bit and changing value when the bit changes value.

The memory controller comprises two operating modes which are respectively a utilization mode, to establish the control signals when the sensor is operating, and a programming mode to write into the memory the binary words corresponding to the control signals to be established. The sensor includes a programming interface circuit for establishing a communication between a processor external to the sensor and the memory controller in order to perform the desired programming from outside the sensor.

The sensor further preferably includes a synchronization control circuit, establishing an instant of startup of the series of control signals in relation to the global operation of the pixel matrix, and notably in relation to the readout rate for the rows of the matrix. This circuit can establish instants of startup of a series of control signals, for example at the start of a charge integration cycle in a row of pixels, or at the start of an actual readout cycle beginning with a reset of a memory node of the pixel, etc. The synchronization circuit can establish a periodic startup instant which is renewed for each row of pixels. The synchronization circuit also determines which is the series of control signals to be established at a given moment, the sequencing circuit preferably being suitable for generating various series of control signals.

The memory can include several areas, each area corresponding to a respective group of control signals to be established, and the sequencing circuit includes a programmable register into which there are written, for each group, an item of information indicating the start of the memory area to be used and an item of information indicating the number of successive addresses to be used for this area. Depending on the group of control signals to be generated, and under the control of the synchronization circuit, the memory controller transmits to the memory, at the frequency of the reference clock, the succession of addresses to be used.

Lastly, provision may be made for the sequencing circuit to comprise several programmable memories each having an associated controller and an associated control signal generation circuit. Each of these groups is dedicated to a respective series of several control signals (or to a group of series of several control signals). A multiplexer provides for directing to the respective control lines of the sensor the signals generated by the various generation circuits, given that the various series can partly be intended for the same control lines of the pixel matrix or readout circuits.

In the U.S. patent application publication US2007/0146523, a signal generator is described, which includes a memory which stores data defining desired levels of control signals, and a memory which stores moments of transition that define the moments when a new word representing the levels of the control signals should be extracted from the data memory.

BRIEF DESCRIPTION OF THE DRAWINGS

Other features and advantages of the invention will become apparent upon reading the following detailed description given with reference to the accompanying drawings in which:

FIG. 1 represents a sequencing circuit according to the invention, incorporated in an image sensor;

FIG. 2 represents an example control signal sequence, comprising a series of six control signals;

FIG. 3 represents the breakdown of these signals into logic values at the rate of the clock frequency over a duration of 42 clock pulses;

FIG. 4 represents the content of the programmable memory for establishing the sequence of signals;

DETAILED DESCRIPTION

Figure 5:
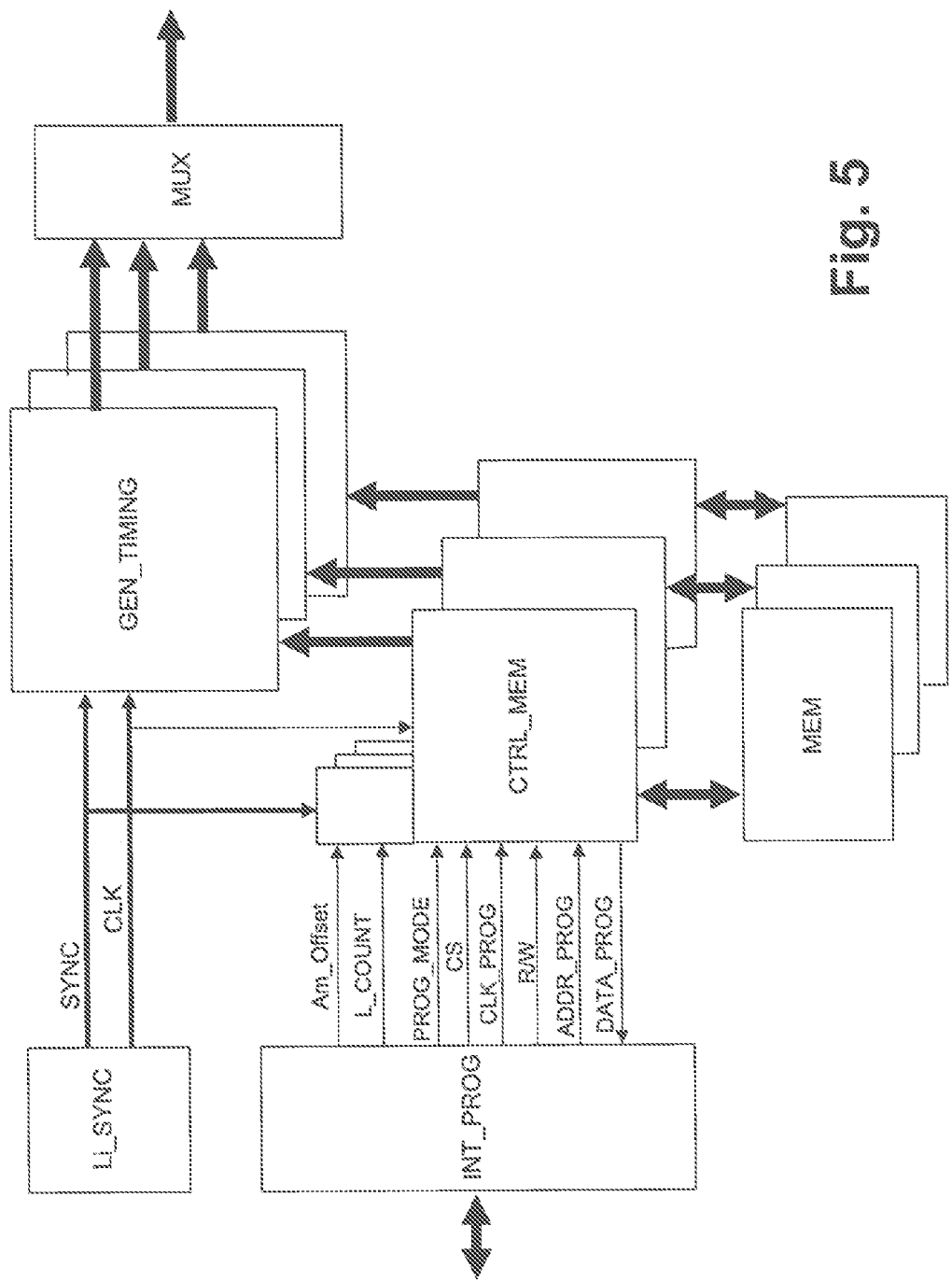
FIG. 5 represents an architecture with several programmable memories and several control signal generation circuits, the control signals being multiplexed before being applied to the pixel matrix.

In FIG. 1, neither the pixel matrix of the image sensor nor the readout circuits for collecting the signals generated by the pixels through the effect of the light and for converting these signals into digital form are represented. Only the principle of the sequencing circuit according to the invention is represented, which establishes a series of control signals intended for the pixel matrix and/or intended for the readout circuits at the base of each column of pixels.

The sequencing circuit comprises the following main items:

an addressable and programmable memory MEM, a memory controller CTRL_MEM which controls this memory in order to write data to it and to extract data from it, a generation circuit GEN_TIMING for generating a series of control signals, using the data extracted from the memory at constant frequency;

a programming interface circuit INT_PROG for controlling the memory controller in order to program the content of the memory.

A synchronization circuit Li_SYNC manages the synchronization of the sequencing circuit with respect to the general operation of the sensor, in order that the control signals generated by the sequencing circuit match the rate of general operation of the sensor. The synchronization circuit sends synchronization signals SYNC, and notably a pulse defining the instant in which a series of control signals must begin to be produced. This circuit Li_SYNC can form part of a general sequencer of the sensor which establishes the operation of the pixel matrix more globally, for example a sequencer which defines the frame period, the integration time, the row period, etc.

The memory MEM is an addressable dynamic RAM memory containing words for which the number of bits (for example 10 or 16) defines the maximum number of control signals which can be generated simultaneously. The number of words in the memory is related to the length of the control signals which can be generated, either simultaneously or separately. The memory can comprise several areas, each area corresponding to a given series of control signals.

The memory controller CTRL_MEM operates in two modes: programming and utilization. In programming mode (signal PROG_MODE active), it is used to supply the memory with addresses and the data to be written to these addresses. In utilization mode, it is used to supply to the memory, at a fixed clock rate given by a reference clock CLK, a series of consecutive addresses between a start address of a functional sequence and an end address of the functional sequence (such as a pixel reading sequence). To this end, it includes a programmable register which contains the start address AM_Offset and a number L_COUNT of addresses for a given sequence. In the simplest case, if the memory stores the data for only one series of control signals, the start address is the first address A0 of the memory. For the case in which there are several series of signals to be generated, contained in different areas of the memory, the controller uses the start addresses AM_Offset and the lengths L_COUNT associated with the series to be produced.

The programming interface circuit INT_PROG is an external communication circuit which makes the sensor, and more specifically the control circuit CTRL_MEM, communicate with an external processor with a view to programming the memory MEM. It establishes the signals required for this programming (clock CLK_PROG, memory selection CS, read/write selection R/W, programming mode signal PROG_MODE, addresses ADD_PROG, and data DATA_PROG to be written into the memory or read in the memory to check the write operation). The interface circuit also records in registers the address offset values (AM_Offset) and the addressing sequence length values (L_COUNT) required at the memory controller in order to apply to the memory a clearly determined suite of successive addresses.

Lastly, the control signal generation circuit GEN_TIMING operates in utilization mode: it receives at a regular rate the data extracted from the memory and also receives the clock signals CLK and the circuit synchronization signals Li_SYNC. The succession of position 1 bits at the clock rate produces a first logic control signal. The succession of position 2 bits produces a second signal, and so on. In FIG. 1, eight control signal outputs are represented, included among which are six signals SEL, SHR, SHS, TRA, RS_ND, EN_PIX, which are given by way of example and which will be explained hereafter with reference to the next figures.

FIG. 2 represents an example of a series of control signals which are desired to be generated according to the invention from the content of the memory MEM; FIG. 3 represents a transposition of these signals in the form of a succession of binary values at a reference clock rate determined to be sufficient to clearly distinguish the intervals that can exist between the logic transitions of these various signals; and FIG. 4 represents a table of the content which must be programmed into the memory MEM which will enable the control signals to be generated. These diagrams are given purely by way of example, other series of signals clearly being able to be generated along the same principle. This example realistically corresponds to a conventional readout sequence for a row of pixels. The signals are active at the high logic level.

In this example, the pixels have a well known structure including a photodiode and a node for storing charges generated by the photodiode. The pixel which must be read (in practice all the pixels of a given row simultaneously) is selected by a signal SEL. This signal SEL transfers to a column conductor common to the pixels of a given column the potential of the storage node, via a follower transistor forming part of the pixel. The column conductor is supplied with current under the control of a signal EN_PIX which authorises the passage of a current into the follower transistor and which enables it to execute its voltage follower function. The charge storage node is first reset to a reference potential by a control signal RES_ND. The potential of the column conductor, representing the potential of the reset storage node, is then read by means of a control signal SHR which is a control signal for the readout circuits at the column base; then the storage node receives the charges generated by the photodiode under the control of a transfer signal TRA and the potential of the column conductor, representing the potential of the storage node thus filled, is then read by means of a control signal SHS (readout circuit control signal).

The readout signals associated with this sequence and applied to the column base readout circuits are a signal SHR (for the sampling in the readout circuits of potentials of the column conductor after the reset phase) and a signal SHS (for the sampling in the readout circuits of potentials of the column conductor after the charge transfer phase).

Therefore in this example there are six control signals: four pixel control signals (SEL, EN_PIX, RES_ND, TRA) and two readout circuit control signals (SHR, SHS). In other examples, there could be a greater number of signals.

The sequence runs between an instant t0 and an instant $t_F$ which define respectively the beginning and the end of a functional sequence. Some of the signals include only one pulse at the active level, others include two. Yet other signals, not represented, could include more than two.

The reference clock rate chosen to establish these signals is given by a clock CLK, the frequency of which is sufficient to clearly show the difference (one clock period) between the falling edge of the signals SEL, SHR, SHS, and the rising edge of the transfer signal TRA.

The low or high logic level of each of the control signals is defined for each clock period (42 periods for the overall sequence in the example represented).

FIG. 3 represents all the logic levels of each of the signals for each period of the clock CLK, numbered from 0 to 41 between the instant t0 and the instant $t_F$. The low or high logic level is represented by a bit value 0 or 1. The 42 clock periods here define the duration of a complete functional sequence.

FIG. 4 represents the content which must be recorded in the memory MEM in order to generate the control signals. This content is represented in the form of a table comprising a succession of 42 addresses, with one word stored at each address. The addresses are numbered A0 to A41 and each corresponds to a respective clock period, and the order of succession of the addresses corresponds to the order of succession of the clock periods. The word stored at each of these addresses is denoted by M0 to M41.

The binary words include at least as many bits as there are control signals to be generated in the sequence. In this case, six bits are required, and the memory includes for example words of 10 bits, the last four of which remain unused in this example. The position i of the bit in the word is directly associated with one of the control signals to be produced, which will be referred to as the position i signal.

Thus, for all the words, the position 1 bit (taken from left to right) represents the first control signal SEL, the position 2 bit represents the signal SHR, the position 3 bit represents the signal SHS, the position 4 bit represents the signal TRA, the position 5 bit represents the signal RES_ND, and the position 6 bit represents the signal EN_PIX.

An arrow linking a rectangle in FIG. 3 to a rectangle in FIG. 4 represents the correspondence between the logic values of the signals at a given instant (in this case, the clock period numbered 12) and the word stored at a memory address (in this case A12) corresponding to this instant. The word is made up of binary values of signals of position i=1 to N at a determined clock period corresponding to the address of the word.

To create the control signals when the sensor is being used, all the successive addresses from A0 to A41 are extracted from the memory at the clock rate CLK from an instant t0, and the successive bits of a given position are used to create a logic signal, the level of which varies between a high value and a low value in correspondence with the value of the successive bits, the signal remaining constant at one level as long as the bits follow one another at the same logic value and changing level when the bits change value. The various signals in FIG. 2 are thus reproduced using the bits of various positions. These signals are created in the generation circuit GEN_TIMING which receives the data from the memory at the clock rate and which is synchronized by the signals SYNC in correspondence with the global operation of the pixel matrix.

In sensor programming mode, the programming interface circuit INT_PROG transmits an active signal PROG_MODE which indicates to the controller that the memory must be programmed. It also transmits a signal CS which indicates that it is definitely this memory which is chosen, especially when there are several memories. It supplies a signal R/W indicating whether the controller must read or write in the memory. Lastly, it supplies the addresses (ADDR_PROG) in which it is necessary to read or write and the words (DAT_PROG) to write to these addresses. The programming operation, with the signal R/W active in write mode, entails writing all the data, then, with the signal R/W inactive, rereading the data to verify that the written data is the desired data. The write process is performed at a frequency CLK_PROG which can be different from the read-mode frequency and different from the frequency of the reference clock CLK in sensor utilization mode.

In sensor utilization mode, the programming interface maintains an inactive value for the signal PROG_MODE and for the signal R/W and the memory controller communicates only with the memory. It applies to the memory at a constant rate (clock CLK) the successive addresses starting from the first or from an address AM_Offset programmed beforehand and up to an address calculated from the sequence length information (number of clock periods L_COUNT) also programmed beforehand.

The operation of the sensor for only one series of control signals has been described above in detail. In practice, several series of signals need to be established. Several memories, several memory controllers and several signal generation circuits, such as those of FIG. 1, can be provided; the synchronization circuit Li_SYNC, depending on requirements, chooses the one or those of these groups which must be used at a given moment. The synchronization circuit gives sequence startup pulses each time to the group of circuits in question. Given that various sequences can be recorded in memory and given that these sequences can use signals in common, provision will be made to multiplex the outputs of the various generation circuits GEN_TIMING for the common signals, i.e. the signals which must be applied to the same control conductor.

FIG. 5 represents the general architecture of the resulting sequence generation circuit.

The invention claimed is:

1. An image sensor comprising a matrix of rows and columns of active pixels, readout circuits, and a sequencing circuit for applying control signals to the pixels and/or to the readout circuits according to clearly determined sequences, wherein the sequencing circuit comprises:
a programmable addressable memory containing binary words in which each word comprises a group of several bits of position 1 to N, and in which the position i of a bit in a word corresponds to the position i of a respective control signal from among a series of control signals for pixels and/or readout circuits of the sensor,
a memory controller for extracting from the memory at a fixed clock rate the words located at successive addresses of the memory from a start address to an end address, which define respectively the beginning and the end of an operational sequence of the image sensor,
and a control signal generation circuit establishing each control signal of position i from the succession at the fixed clock rate of bits of respective position i that are extracted from the memory by the controller, the control signal having a first value or a second value according to the value of the bit and changing value when the bit changes value.

2. The image sensor according to claim 1, further including a synchronization control circuit, establishing an instant of startup of the series of control signals in relation to the global operation of the pixel matrix, and notably in relation to the readout rate for the rows of the matrix.

3. The image sensor according to claim 1, wherein the memory includes several areas, each area corresponding to a respective group of control signals to be established, and the sequencing circuit comprises a programmable register into which there are written an item of information indicating the start of the memory area to be used and an item of information indicating the number of successive addresses to be used for this area.

4. The image sensor according to claim 1, wherein the memory controller comprises two operating modes which are respectively a utilization mode, to establish the control signals when the sensor is operating, and a programming mode to write into the memory the binary words corresponding to the control signals to be established.

5. The image sensor according to claim 4, including a programming interface circuit for establishing a communication between a processor external to the sensor and the memory controller in order to perform the desired programming from outside the sensor.

6. The image sensor according to claim 5, further including a synchronization control circuit, establishing an instant of startup of the series of control signals in relation to the global operation of the pixel matrix, and notably in relation to the readout rate for the rows of the matrix.

7. The image sensor according to claim 5, wherein the memory includes several areas, each area corresponding to a respective group of control signals to be established, and the sequencing circuit comprises a programmable register into which there are written an item of information indicating the start of the memory area to be used and an item of information indicating the number of successive addresses to be used for this area.

* * * * *